Patented Oct. 3, 1950

2,524,566

UNITED STATES PATENT OFFICE 2,524,566

PRODUCTION OF COPPER-MAGNESIA HYDROGENATION CATALYST AND ITS USE IN HYDROGENATION REACTIONS

Johannes P. W. Houtman and George C. A. Schuit, Amsterdam, the Netherlands, assignors to Shell Development Company, San Francisco, Calif., a corporation of Delaware No Drawing. Application June 7, 1948, Serial No. 31,607. In the Netherlands June 11, 1947

8 Claims. (Cl. 260—638)

This invention relates to the preparation of active catalysts consisting essentially of copper and magnesium oxide with or without inert diluent materials.

Certain metals are known to be excellent hydrogenation catalysts when applied in a state affording a suitable surface. Metallic nickel, for example, is widely used in the form of a fine powder in the hydrogenation of fats and oils. Other metals are known which are not very active per se but make excellent catalysts when applied with certain other less active materials. Examples of such metals are cobalt, chromium and copper. The catalytic activity of these metals can be greatly improved by applying them in combination with a wide variety of so-called carrier materials. However, certain combinations are much more active and suitable than others. Thus, for example, the best cobalt catalysts are prepared by applying the cobalt in combination with a selected kieselguhr, and chromium and its compounds are preferably applied in combination with certain types of alumina. Copper is preferably applied in combination with magnesia, and this combination is now generally recognized as one of the best hydrogenation catalysts. In making this catalyst combination the copper and the magnesia can be and have been combined in a number of ways.

It is well known that the method of preparation of multi-component catalysts is frequently as important as the chemical composition itself in determining the properties of the catalyst and that often seemingly trivial modifications in the method of preparation make great differences. In some cases the reason for the difference can be explained and in others it cannot. In view of the complexity and unpredictability of the matter this phase of catalysis, at least, is on a purely empirical basis. The usual and preferred method for combining the copper and magnesia is by coprecipitation. Coprecipitation is frequently used in the preparation of multi-component catalysts, and this method has been shown in many cases to give better catalysts than methods involving impregnation, precipitation of one component on the other, dry mixing of the components and other alternative methods. (See Ind. Eng. Chem., 20, 694 (1928).) The greater activity is presumably due to a more intimate association of the copper and magnesia. That this method does produce a more intimate mixture in the case of copper-magnesia catalysts has been shown. (See Bull. Soc. Chim. Belg., 46, 241 and 293 (1937).) In the usual case a copper salt and a magnesium salt in the desired ratio are dissolved in water and the copper hydroxide and magnesium hydroxide are coprecipitated by the addition of a suitable base such as sodium hydroxide or potassium hydroxide. If the base is added rather rapidly the resulting precipitate is not homogeneous. (See J. A. C. S., 63, 2906 (1941).) Catalysts produced through such a rather rapid precipitation are appreciably less active. However, if the precipitation is carried out slowly and/or if the precipitate is allowed to age for several hours in the mother liquor the composition becomes essentially homogeneous and a more active catalyst results. Essentially homogeneous and fairly active catalyst can also be produced by reversing the normal procedure and adding the solution of the mixed metal salts to an excess of the base. (See J. A. C. S., 63, 2911 (1941).)

We have carried out research on the preparation of highly active copper catalysts. Our findings agree with the findings of other prior investigators as regards the choice of the combination of copper with magnesia and the desirability of using a coprecipitation method. We have found, however, that other factors than homogeneity are of great importance in preparing a highly active catalyst and that, in fact, improved catalysts can be prepared by a method which does not lead to a homogeneous product. We are still not prepared to explain why one method of preparation gives a more active catalyst than another, but we nevertheless are able by our method to prepare more active catalysts of this type. We have found that catalysts of this type may be greatly improved if in the preparation the precipitation is controlled such that the copper is precipitated along with a part of the magnesium as a basic copper salt. e. g. basic copper nitrate, rather than the hydroxide, followed by precipitation, preferably rapid, of the remainder of the magnesium. In order to prepare the catalyst in this manner it is necessary to carefully control the hydrogen ion concentration in the first precipitation step during which the copper is precipitated as the basic copper salt along with part of the magnesium as magnesium hydroxide. Thus, it is necessary to effect the precipitation of the copper under conditions of pH at which the basic salt is not yet converted into copper hydroxide. This maximum pH is about 9.5. On the other hand it is necessary that the conditions of pH be such that the coprecipitation of part of the magnesium also takes place. This minimum pH is about 7.5. When effecting the precipitation under these conditions the rate of precipitation is unimportant and unlike the usual direct coprecipitation where a very slow precipitation is required to produce a homogeneous mixture of suitable catalytic activity, the precipitation may be effected rapidly. In order that the above-specified conditions of pH may be maintained during the first precipitation step it is necessary that the acidic and basic solutions be added simultaneously to the chamber or vessel in which the first precipitation step is effected since the required conditions of pH cannot be maintained if the basic solution is added to the acidic solution as in the usual direct coprecipitation method or vice versa as in the reverse coprecipitation method. The precipitate obtained in this phase of the precipitation consists essentially of a coprecipitate of the basic copper salt and part of the magnesium.

After the copper and part of the magnesium have been precipitated under the described conditions of pH the precipitation is completed in a second step by raising the pH to 12 or above. In this second step the remainder of the magnesium is precipitated as the hydroxide and part of the basic copper salt is converted to copper hydroxide.

After the precipitation has been completed by raising the pH to 12 or above the precipitate is filtered off and rinsed. The precipitate may age in contact with the mother liquor, but it is preferable to separate the precipitate from the mother liquor as quickly as possible. Thus, the precipitate is preferably filtered from the mother liquor within 5 minutes of its final formation.

It is not usually necessary to employ inert diluents or supports in this type of catalyst. However, such materials are sometimes advantageously employed and may be added if desired. In such cases where they are used they may be added at any convenient stage in the preparation of the catalyst. Thus, a carrier material such as powdered alumina, silica, asbestos, pumice stone, kieselguhr, magnesium oxide, magnesium carbonate or magnesium silicate may be added during the first or second step of the precipitation or mixed with the filtered precipitate. Lubricants for pelleting, strengthening agents and/or promoters such as graphite, flour, starch, stearic acid, sodium silicate, thoria, alumina, or the like may also be incorporated if desired. Such materials, if used, are relatively minor or temporary constituents which do not change the fundamental characteristics of the copper-magnesia catalyst.

The coprecipitated mixture, with or without the mentioned optional constituents, may be formed into particles of the desired size and shape by any of the conventional methods, including grinding, extruding and pelleting. The raw catalyst is finally reduced by treating it with a reducing gas, e. g. hydrogen, in the conventional manner.

A preferred method for preparing the catalyst on the commercial scale is as follows:

Magnesium nitrate and copper nitrate are dissolved in water in the desired ratio. The concentration of the solution is not important. In the case of an approximately 0.3 molal solution the pH of the resulting solution with various molecular ratios of magnesium to copper are as given in the following table:

TABLE I

| Molality | | pH |
|---|---|---|
| Mg | Cu | |
| 0.29 | 0.0059 | 5.75 |
| 0.27 | 0.027 | 5.30 |
| 0.25 | 0.050 | 5.13 |
| 0.23 | 0.069 | 5.03 |
| 0.21 | 0.086 | 4.95 |
| 0.20 | 0.10 | 4.91 |
| 0.15 | 0.15 | 4.74 |
| 0.10 | 0.20 | 4.65 |

A second solution of the base having a pH above 9.5 is also prepared. The base is sodium hydroxide or any other base affording the desired alkalinity.

The two solutions are then introduced continuously and simultaneously into the precipitation vessel which may advantageously be of the kind described in U. S. Patent No. 2,258,111. The rate of introduction of the separate solutions is adjusted by valves or proportioning pumps to maintain the pH in the precipitation within the range of 7.5 to 9.5, e. g. 8.5. The copper is thus substantially completely precipitated as the basic nitrate along with a part of the magnesium as the hydroxide. The slurry thus formed is then passed continuously to a second vessel or tank containing an excess of a basic solution having a pH above 12, or the second basic solution may be introduced simultaneously with the slurry into a second mixing apparatus of the design mentioned. In this second step of the precipitation the remainder of the magnesium is precipitated as the hydroxide and part of the basic copper salt is converted to copper hydroxide. While it is possible, as pointed out above, to use a weaker base in the first step of the precipitation, the same strong base, e. g. sodium or potassium hydroxide, may be used in both precipitation steps. The slurry produced after the second precipitation step is then immediately passed to a filter wherein the precipitate is separated and rinsed. The further drying, pelleting and reduction are then carried out in the conventional manner to produce the finished catalyst. While the above-described method for preparing the catalyst according to the invention is particularly suited for operations on a fairly large scale the invention is not limited to this particular method.

When starting with copper nitrate and/or magnesium nitrate the catalysts prepared by the described two-step precipitation method generally give off ammonia upon reduction with hydrogen. This shows that some of the basic nitrate is still present after the second precipitation step. The ammonia is most pronounced when the second precipitation is carried out rapidly and the precipitate is separated from the mother liquor immediately after completing the second precipitation step. It is not known whether the presence of some residual basic copper salt at this stage is responsible for the superiority of the catalyst or not, but it is noticed that the most highly active catalysts give off appreciable amounts of ammonia during the reduction. The reduction is generally carried out with hydrogen at about 300° C.; other reducing gases, e. g. vapors of methyl alcohol, and other temperatures may however be employed. X-ray examination also shows that the catalysts produced according to the invention have different crystallographic properties. In the dried state prior to the reduction, where the copper and magnesium are both present essentially as the hydroxides, the catalysts prepared according to the method of the invention show an additional reflection at a d-value of about 7.5 Angstroms. This reflection which is not observed in the case of the usual copper-magnesia catalysts, varies slightly in position and intensity with different batches of catalyst and cannot at present be explained. Also, the catalysts produced according to the invention are generally very black, in contrast to the usual known copper-magnesia catalysts which are usually somewhat russet colored or blue depending upon their method of preparation. It has also been found that the catalysts prepared according to the invention have a lower content of coarse crystalline copper particles than copper-magnesia catalysts produced in the normal manner.

*Example I*

Two solutions were prepared, one consisting of a 16% solution of sodium hydroxide and the other consisting of 1.5 gram moles each of copper nitrate and magnesium nitrate in 5 liters of water. The two solutions were simultaneously added with stirring to a precipitation vessel containing 4 liters of water at such rates that the pH of the mixture in the precipitation vessel did not vary from 8 by more than 0.2. The pH of the slurry was then raised to above 12 by the addition of an extra quantity of the sodium hydroxide solution to precipitate the remainder of the magnesium. After several hours the precipitate was filtered from the mother liquor and rinsed. The precipitate was dried at 100° C. and then reduced by treatment with hydrogen at 300° C. The catalyst having a density of 0.42 gram per cubic centimeter was used in the vapor phase hydrogenation of methylethylketone at 160° C. and atmospheric pressure. Methylethylketone and hydrogen were passed over the catalyst at rates corresponding to 95 weight parts of methylethylketone per part of catalyst per hour and 25,000 volume parts per volume of catalyst per hour, respectively. Under these conditions 49 mol percent of the methylethylketone applied was converted to secondary butyl alcohol. Under these conditions of temperature and pressure the maximum theoretically possible conversion would be 65 mol percent. Thus, the conversion was about 75% of the theoretical. This was considerably better than was to be expected with a copper magnesia catalyst.

*Example II*

A catalyst was prepared as described in the above example, except that the precipitate was filtered from the mother liquor immediately after raising the pH to above 12. In this case the reduction of methylethylketone to secondary butyl alcohol was 57 mol percent or about 87% of the theoretical.

*Example III (comparative)*

A catalyst was prepared as in the above example, except that the precipitation was carried out in one stage at a pH of 11± 0.2. When methylethylketone was hydrogenated with this catalyst under the same conditions described above only about 25 mol percent was converted to secondary butyl alcohol. This was about 38% of the theoretical conversion.

*Example IV (comparative)*

A catalyst was prepared as in the above Example I except that in the second step of the precipitation the pH was raised to a value of only 11. When methylethylketone was hydrogenated with this catalyst under the same conditions only about 10 mol percent was converted to secondary butyl alcohol.

Comparative Examples III and IV in which the catalyst was not prepared according to the invention are submitted to indicate the criticality of the specified conditions of pH and also as a matter of general interest.

The improved copper-magnesia catalysts prepared according to the invention may be employed with advantage in place of the previously known and used copper-magnesia catalysts. Thus, they may be used as a general catalyst for hydrogenation or dehydrogenation. They are particularly suitable for the hydrogenation of carbonylic compounds. e. g. various aldehydes and ketones to the corresponding alcohols and, conversely for the dehydrogenation of carbinols to their corresponding carbonylic compounds, e. g. aldehydes and ketones.

They are also particularly suitable for catalyzing the water gas shift $$CO + H_2O \rightarrow CO_2 + H_2$$

and the steam methane reaction:

$$CH_4 + H_2O \rightarrow CO + 3H_2$$

When the catalysts of the invention are used for the hydrogenation of aromatic hydrocarbons, e. g. the hydrogenation of benzene to cyclohexane at about 300° C., they are found to be more stable against sintering than the copper-magnesia catalysts produced by the known methods.

We claim as our invention:

1. Process for the production of copper-magnesia catalyst which comprises commingling an aqueous solution of a copper salt and a magnesium salt with an aqueous solution of a base in an aqueous medium while maintaining the pH of the resulting mixture between 7.5 and 9.5 whereby the copper is precipitated as a basic copper salt along with part of the magnesium hydroxide, subsequently adding sufficient base to the reaction mixture that the pH thereof is increased to above 12 and the remainder of the magnesium is precipitated as the hydroxide, separating the precipitate from the reaction medium and reducing the same.

2. Process for the production of copper-magnesia catalyst which comprises commingling an aqueous solution of a copper salt and a magnesium salt with an aqueous solution of a base while maintaining the pH of the resulting mixture between 7.5 and 9.5 whereby the copper is precipitated as a basic copper salt along with part of the magnesium as magnesium hydroxide, then within five minutes adding sufficient base to the reaction mixture that the pH thereof is increased above 12 and the remainder of the magnesium is precipitated as the hydroxide, separating the precipitate from the reaction medium and reducing the same.

3. Process for the production of copper-magnesia catalyst which comprises commingling an aqueous solution of a copper salt and a magnesium salt with an aqueous solution of a base in an aqueous medium while maintaining the pH of the resulting mixture between 7.5 and 9.5 whereby the copper is precipitated as a basic copper salt along with part of the magnesium as magnesium hydroxide, subsequently adding sufficient base to the reaction mixture that the pH thereof is increased to above 12 and the remainder of the magnesium is precipitated as the hydroxide, separating the precipitate from the reaction medium within five minutes after raising the pH to above 12 and reducing the same.

4. A copper-magnesia catalyst consisting essentially of copper-magnesia prepared by commingling an aqueous solution of copper nitrate and magnesium nitrate with an aqueous solution of sodium hydroxide in an aqueous medium while maintaining the pH of the resulting mixture between 7.5 and 9.5 whereby basic copper nitrate is precipitated along with part of the magnesium as magnesium hydroxide, subsequently adding sufficient sodium hydroxide to the reaction mixture that the pH thereof is increased to above 12 and the remainder of the magnesium is precipitated as the hydroxide, separating the precipitate from the reaction medium and drying and reducing the same, said precipitate in the dry state prior to reduction showing an additional X-ray reflection at a $d$-value of about 7.5 Angstrom units.

5. In the catalyzation of a hydrogenation reaction with a coprecipitated copper-magnesia catalyst the improvement which comprises catalyzing the hydrogenation reaction with a catalyst consisting essentially of a reduced coprecipitate of copper and magnesia, said catalyst having been formed by commingling an aqueous solution of copper nitrate and magnesium nitrate with an aqueous solution of sodium hydroxide in an aqueous medium while maintaining the pH of the resulting mixture between 7.5 and 9.5 whereby basic copper nitrate is precipitated along with part of the magnesium as magnesium hydroxide, subsequently adding sufficient sodium hydroxide to the reaction mixture that the pH thereof is increased to about 12 and the remainder of the magnesium is precipitated as the hydroxide, separating the precipitate from the reaction medium and drying and reducing the same.

6. In the reduction of a carbonylic compound to the corresponding carbinol by hydrogenation with a copper-magnesia catalyst the improvement which comprises effecting said reduction with a catalyst consisting essentially of a reduced coprecipitate of copper and magnesia said catalyst having been formed by commingling an aqueous solution of copper nitrate and magnesium nitrate with an aqueous solution of sodium hydroxide in an aqueous medium while maintaining the pH of the resulting mixture between 7.5 and 9.5 whereby basic copper nitrate is precipitated along with part of the magnesium as magnesium hydroxide, subsequently adding sufficient sodium hydroxide to the reaction mixture that the pH thereof is increased to above 12 and the remainder of the magnesium is precipitated as the hydroxide, separating the precipitate from the reaction medium and drying and reducing the same.

7. In the hydrogenation of an aromatic hydrocarbon with a copper-magnesia catalyst the improvement which comprises effecting said hydrogenation with a catalyst consisting essentially of a reduced coprecipitate of copper and magnesia said catalyst having been formed by commingling an aqueous solution of copper nitrate and magnesium nitrate with an aqueous solution of sodium hydroxide in an aqueous medium while maintaining the pH of the resulting mixture between 7.5 and 9.5 whereby basic copper nitrate is precipitated along with part of the magnesium as magnesium hydroxide, subsequently adding sufficient sodium hydroxide to the reaction mixture that the pH thereof is increased to above 12 and the remainder of the magnesium is precipitated as the hydroxide, separating the precipitate from the reaction medium and drying and reducing the same.

8. In the hydrogenation of an oxide of carbon with a copper-magnesia catalyst the improvement which comprises effecting said hydrogenation with a catalyst consisting essentially of a reduced coprecipitate of copper and magnesia said catalyst having been formed by commingling an aqueous solution of copper nitrate and magnesium nitrate with an aqueous solution of sodium hydroxide in an aqueous medium while maintaining the pH of the resulting mixture between 7.5 and 9.5 whereby basic copper nitrate is precipitated along with part of the magnesium as magnesium hydroxide, subsequently adding sufficient sodium hydroxide to the reaction mixture that the pH thereof is increased to above 12 and the remainder of the magnesium is precipitated as the hydroxide, separating the precipitate from the reaction medium and drying and reducing the same.

JOHANNES P. W. HOUTMAN.
GEORGE C. A. SCHUIT.

REFERENCES CITED

The following references are of record in the file of this patent:

UNITED STATES PATENTS

| Number | Name | Date |
| --- | --- | --- |
| 1,937,728 | Storch | Dec. 5, 1933 |
| 2,094,611 | Lazier | Oct. 5, 1937 |
| 2,236,514 | Burk et al. | Apr. 1, 1941 |
| 2,275,152 | Lazier | Mar. 3, 1942 |

OTHER REFERENCES

Jour. Am. Chem. Soc., November, 1941, pages 2911–2915.

Chemical Abstracts, vol. 32 (1938), page 2011 (3). (Abstract of Article from Bull. Soc. Chim. Belg. 46, 393–408 (1937), by Vernulst et al.)